(12) United States Patent
Parker (10) Patent No.: US 6,494,477 B1
(45) Date of Patent: Dec. 17, 2002

(54) AUTOMATIC TRAILER HITCH COUPLING APPARATUS

(76) Inventor: Daniel C. Parker, 26000 Bald Hill Rd. P.O. Box 156, Comptche, CA (US) 95427

( * ) Notice: Subject to any disclaimer, the term of this patent is extended or adjusted under 35 U.S.C. 154(b) by 0 days.

(21) Appl. No.: 10/010,626

(22) Filed: Nov. 8, 2001

(51) Int. Cl.[7] .............................. B60D 1/38; B60D 1/40
(52) U.S. Cl. ................................ 280/479.1; 280/479.3
(58) Field of Search .................. 280/477, 478.1, 280/479.1, 479.2, 479.3, 480, 480.1, 491.2, 494

(56) References Cited

U.S. PATENT DOCUMENTS

| | | | | |
|---|---|---|---|---|
| 2,150,010 A | * | 3/1939 | Solomon | |
| 3,761,113 A | * | 9/1973 | Smitherman | |
| 4,178,011 A | * | 12/1979 | Kirsch | ............ 280/477 |
| 4,466,632 A | * | 8/1984 | DeVorak | |
| 4,807,899 A | * | 2/1989 | Belcher | ............ 280/477 |
| 5,048,854 A | * | 9/1991 | Clark | ............ 280/477 |

\* cited by examiner

*Primary Examiner*—Anne Marie Boehler
(74) *Attorney, Agent, or Firm*—Larry D. Johnson; Craig M. Stainbrook; Johnson & Stainbrook, LLP (57) ABSTRACT

An automatic trailer hitch coupling apparatus having a hitch bar receiver mounted on a platform at the rear end of a towing vehicle, said hitch bar receiver having a square cross section and a flanged rear end into which a hitch bar is removably inserted. A winch have an extendable and retractable cable is mounted on the towing vehicle proximate the receiver and a cable having a cable lead is fed outwardly from the receiver. A hitch bar for coupling within the hitch bar receiver has a front portion connected to a rear portion with a universal joint; the front portion is connected to the cable lead with a quick release and lock system. The hitch bar is integrally connected to a hitch tongue having a horizontal portion on which a hitch ball is mounted.

9 Claims, 6 Drawing Sheets

AUTOMATIC TRAILER HITCH COUPLING APPARATUS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to devices for hitching a trailing vehicle to a towing vehicle, and more particularly to an automatic trailer hitch coupling apparatus that facilitates use by a wide variety of operators, including unskilled and physically impaired operators.

BACKGROUND INFORMATION AND DISCUSSION OF RELATED ART

It is well known that hitching a towed vehicle to a towing vehicle can require significant strength, and occasionally skill. Furthermore, bringing a heavy and clumsy towed vehicle into effective registration with a towing hitch frequently necessitates situating the towing and towed vehicles such that the longitudinal axes are aligned. This is often difficult to accomplish. Accordingly, it is desirable to have an apparatus operable by the elderly, the weak, the physically impaired, or the injured, which effectively assists in easily hitching and automatically hitching a towed vehicle to a towing vehicle, even when the vehicles are significantly out of alignment.

Several hitch devices have been proposed for coupling a towed vehicle to a towing vehicle. It is well known to provide a trailer coupling with a manual or motorized winch to assist coupling of large or heavy loads. Illustrative examples include U.S. Pat. No. : 2,170,983 to Adams, U.S. Pat. No. 3,345,082 to Atkins; U.S. Pat. No. 3,596,925 to Richie; U.S. Pat. No. 3,761,113 to Smitherman; and U.S. Pat. No. 3,848,895 to Christopher; U.S. Pat. No. 4,466,632 to DeVorak; U.S. Pat. No. 4,807,899 to Belcher; and U.S. Pat. No. 5,048,854 to Clark.

The trailer hitch coupling device disclosed in the Dvorak patent includes a drawbar with a bellmouth hitch sleeve bolted to the truck bumper or frame and carries an extendible hitch tongue securely nested within the sleeve when towing a trailer or implement. The tongue is attached to one end of a wire rope with the other end of the wire rope reeled around a winch drum member, incorporated into the trailer hitch. When the wire rope is unreeled, the hitch tongue is allowed to be drawn out of the sleeve for coupling to a tow bar of a trailer. The coupling can be made with the insertion of an interconnecting lock pin. The wire rope is then reeled in on the winch drum while the bellmouth sleeve guides the rope and hitch tongue toward an aligning couple. The winch drum reel is powered by a hand crank to drag the hitch tongue with the attached trailer into a stowed position. A truncated pyramidal portion of the hitch tongue is brought into engagement with the bellmouth hitch sleeve. A second lock pin provides a positive mechanical towing couple between the tongue and sleeve, forming a rigid tow bar unit.

The hitch assembly of the Belcher '899 patent comprises a receiver section that defines a tubular passage and is secured in axial longitudinal alignment on a rear bumper structure of a towing vehicle. A winch is mounted adjacent the receiver structure to retractably extend a cable rearward through the tubular passage for connection to a hitch bar that is adapted for hitch connection to a trailer or implement that is to be towed. The cable can be retracted to draw the hitch bar for tight, locked reception up within the tubular passage. A locking pin automatically drops into position to lock the hitch bar within the hitch receptacle.

The '854 patent to Clark teaches a pivoting quick-connect winch-driven hitch system for coupling trailers to tow vehicles. The system comprises a unitary frame pivotally mounted beneath the bumper of the vehicle by a rigid pivot shaft, which projects upwardly from the center of the frame. A rigid base defines a tubular cavity and a platform for mounting a winch adjacent to the cavity. The cavity receives a rigid bar coupled to the trailer. Deflectors project angularly outwardly from the cavity to define a mouth for guiding the bar into alignment as it enters the mouth. The frame rotates in response to pressure applied by the cable when the trailer is drawn from either side of the tow vehicle. The bar comprises a tapered end, a locking orifice defined centrally through the bar, and an end having an orifice for receiving a trailer connector. A rigid travel-limiting stop projects upwardly between the locking orifice and the open end. The stop limits travel of the bar relative to the mouth to assure proper coupling. The frame pivots roughly sixty-five degrees relative to the longitudinal axis of the cavity. Rotation of the frame is limited by a rigid stop projecting upwardly from the frame. The winch cable is anchored by a hand-tied knot to facilitate repair if broken. A drop pin and cotter pin assembly are employed to ensure safe coupling and to preclude frame rotation when moving.

The above-mentioned related prior art disclose winch assemblies that facilitate drawing a heavy towed load into registration with the hitch. Nevertheless, there are certain disadvantages in the designs. For instance, the hand-driven winch of DeVorak '632 and the powered hitch assembly of Belcher '899 do not provide safe or convenient means to hitch a towed vehicle to a towing vehicle when the vehicles are not in axial alignment.

While the patent to Clark '854 provides such means, it does so with a unitary design that includes a pivoting platform defining the hitch receptacle and to which a winch is mounted. This makes interchangeability of parts and use of only parts of the system on other vehicles difficult and inconvenient. Furthermore, the pivot range of the platform is limited, and no additional means is provided to provide registration of the hitching bar within the hitch bar receptacle other than rotation of the frame and flaring deflectors at the mouth of the receptacle.

Thus, although the above-indicated patents disclose a partial solution to the problem of hitching heavy loads, improvements in the art are needed to facilitate easy hitching of misaligned vehicles, particularly by individuals who are at physical disadvantage.

BRIEF SUMMARY OF THE INVENTION

Accordingly, the automatic trailer hitch coupling apparatus of the present invention provides means for solving the aforementioned problems, including eliminating the need to bring a towing and towed vehicle into close proximity or into alignment before hitching the vehicles; eliminating the need to employ a second person to assist in guiding the driver; eliminating the necessity of lifting a heavy trailer tongue to effect coupling to a hitch receiver; and facilitating hitching on slick, uneven, and slanted surfaces.

The inventive apparatus comprises a hitch bar receiver having a square cross section and a flanged rear end into which the hitch bar is inserted. The hitch bar receiver is mounted on the rear bumper of a vehicle, or another suitably stable platform, and includes an aperture into which a locking pin is inserted when the hitch bar is fully engaged. A hitch bar for coupling within the hitch bar receiver has a front portion connected to a rear portion with a universal joint. In operation, the front portion is connected to a cable lead which has tapering sides for easy and accurate insertion into the hitch bar receiver. A winch, powered or manual, is mounted proximate the receiver.

A hitch ball is mounted on the horizontal portion of a tongue, which also includes a vertical portion functioning as a stop. The hitch ball may be left connected to a trailer tongue socket for easy connection to the automatic hitch coupling cable lead.

The hitch bar is selectively attached or detached from the cable lead with either a quick release and lock system or a threaded post. The quick release and lock system may be connected to the hitch bar with a mere insertion and quarter turn, thus enabling rapid and easy connection for operation. Thereafter, no heavy lifting or struggling to align the vehicles is required to effect hitching. Further, during operation, stress and strain on the cable and the system in its entirety is minimized by the unique two-part hitch bar having a universal joint. The joint keeps the cable in straight alignment relative to the cable lead and facilitates insertion into the receiver as the trailer nears the towing vehicle.

In operation, a user backs a towing vehicle with the rear end nearby the trailer. The winch cable and cable lead are then pulled to the trailer where the quick lock and release is used to connect the lead to the trailer hitch bar. The winch is engaged and the cable is retracted to pull the trailer into registration with the hitch receiver. When the hitch bar is fully inserted into the receiver, a locking pin secure s the h itch bar within the receiver.

When it is desired to disconnect the cable lead from the hitch bar, the locking p in is removed, the cable is fed out to slide out the hitch bar, and the quick release and lock system is disengaged by turning the key for removal from its complementary keyhole.

BRIEF DESCRIPTION OF THE SEVERAL VIEWS OF THE DRAWINGS

FIG. 2 is a partial cross-sectional side view in elevation of the hitch apparatus of FIG. 1, showing the apparatus with the hitching cable extended and connected to the hitch bar, which is separated from the hitching receiver;

FIG. 3 is a side view in elevation of the hitch apparatus of FIGS. 1 and 2, showing the hitch bar fully received and nested within the hitching receiver;

DETAILED DESCRIPTION OF THE INVENTION

Figure 1:
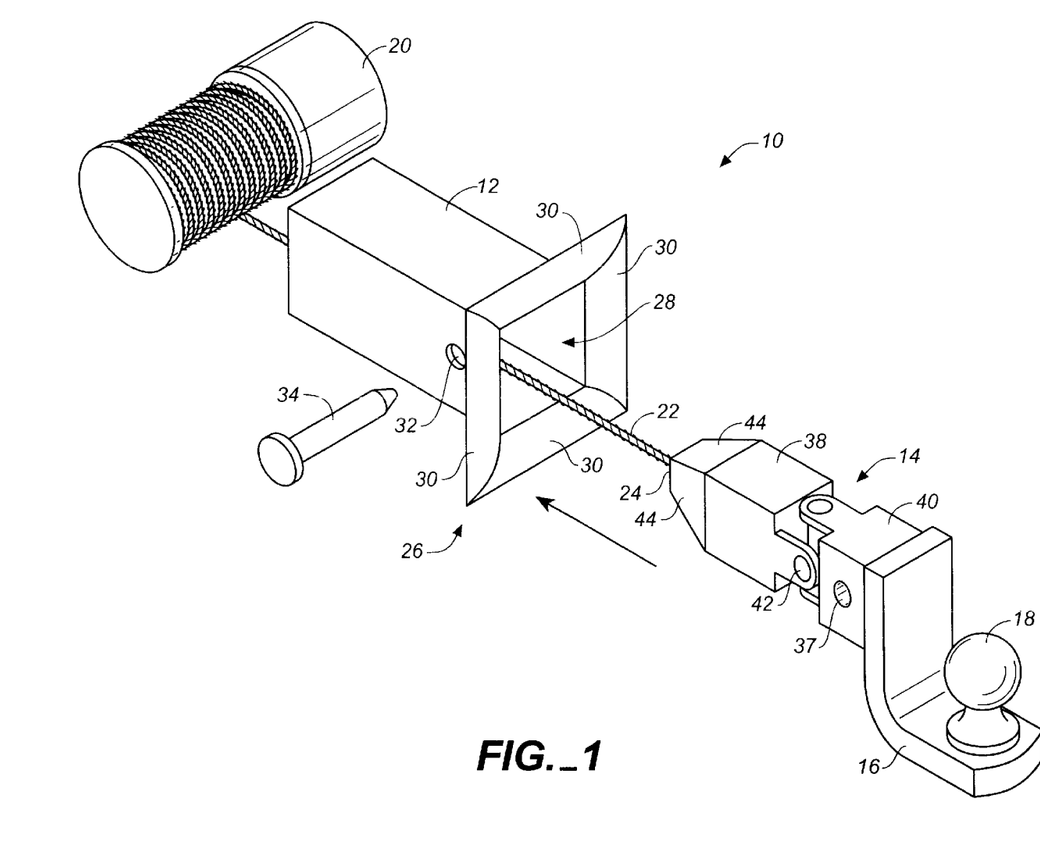
FIG. 1 is a perspective view of a first preferred embodiment of the automatic trailer hitch apparatus of the present invention.

Referring to FIGS. 1 through 9, wherein like reference numerals refer to like components in the various views, FIG. 1 is a perspective view of the automatic trailer hitch apparatus of the present invention, generally denominated by reference numeral 10 herein. This view shows the general components of the inventive apparatus, including a tubular hitch bar receiver or sleeve 12, a hitch bar 14 integral with a tongue 16 to which a hitch ball 18 may be fastened, and a winch 20 having a wound cable 22 terminating in a cable lead 24, the cable being extendable or retractable according to the operation of the winch.

As will be readily appreciated by those having knowledge in the art, the winch may be one of any of a number of suitable motorized and manual winches having power in and power out and free spooling capabilities. An electric winch is preferable for its versatility. Additionally, the size and pulling capacity of the winch may be directed to the intended and desired range of uses.

The hitch bar receiver 12 is preferably fabricated of steel bar stock having a square cross section. It is open and flanged at its rear end 26 and defines a hollow 28 into which the hitch bar 14 may be slidably inserted. As noted, the hitch bar receiver has a flanged rear end, which includes four large, sweeping, outwardly curving flanges 30 which assist in guiding the hitch bar into the receiver when it is imperfectly aligned and which also relieve stress on the cable when the hitch is pulled from an acute angle relative to the receiver.

The hitch bar receiver also includes at least one aperture 32 into which a locking pin(s) 34 is inserted when the hitch bar 24 is fully inserted and a complementary locking hole 36 of hitch bar 24 is aligned with aperture 32. As is well known in the art, for safety purposes locking pin 34 may be permanently mounted on receiver 12 and spring biased, so that when hitch bar is fully inserted and locking hole 36 aligns with aperture 32, locking pin automatically inserts through aperture 32 and locking hole 36, thereby securing the hitch bar within the receiver.

In a first preferred embodiment, hitch bar 24 includes a front portion 38 and a rear portion 40 coupled through a universal joint 42 that allows the two portions to swivel in two planes perpendicular to one another. The front portion 38 includes means for coupling to cable lead 24, the latter which preferably includes tapering sides 44 to facilitate insertion and registration within receiver 12. Locking hole 36 may be positioned in the front portion 38 or the rear portion 40 of hitch bar, or both.

FIG. 2 is a partial cross-sectional side view in elevation of the hitch apparatus of FIG. 1, showing the apparatus with the hitching cable 22 extended and connected to the front portion 38 of hitch bar 14, which is separated from the hitching receiver 12. The connection 46 of cable lead 24 to front portion 38 is shown in phantom. FIG. 3 is a side view in elevation of the hitch apparatus of FIGS. 1 and 2, showing the hitch bar 14 fully received and nested within the hitching receiver. This view also shows that the vertical portion 48 of tongue 16 functions as a stop when the hitch bar is inserted into receiver 12. The horizontal portion 50 of tongue 16 functions as a platform for mounting hitch ball 18, which mounting is preferably accomplished with a conventional threaded post 52 and complementary nut 54, as is well known in the art. Of note, aperture 32 is aligned with locking hole 36 in this configuration.

Figure 4:
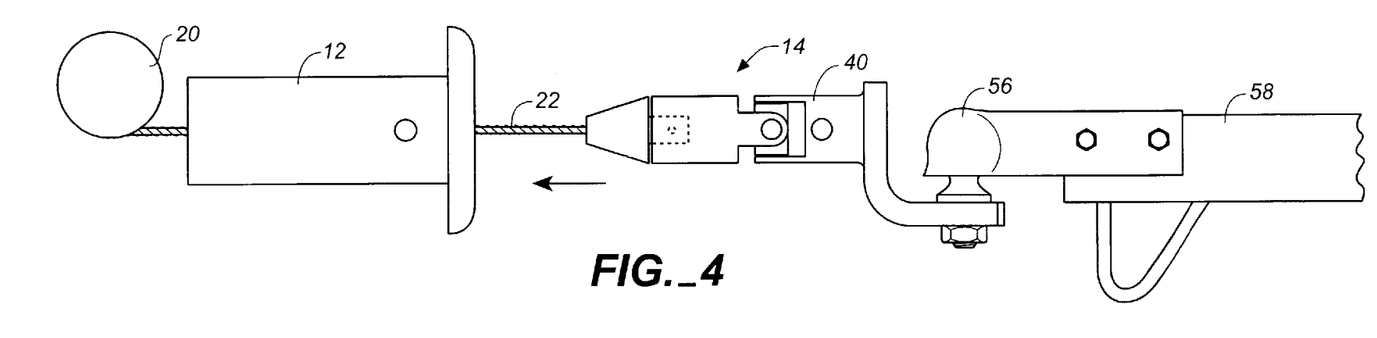
FIG. 4 is a side view in elevation of the inventive apparatus shown with the hitching ball coupled to a trailer socket.

FIG. 4 is a side view in elevation of the inventive apparatus shown with the hitching ball 18 coupled to a trailer socket 56, which, in turn, is connected to a trailer tongue 58. This view illustrates the general function of the inventive apparatus as the hitch bar 14 nears the hitch bar receiver 12 when the cable 22 is retracted or drawn in by the winch 20.

Figure 5:
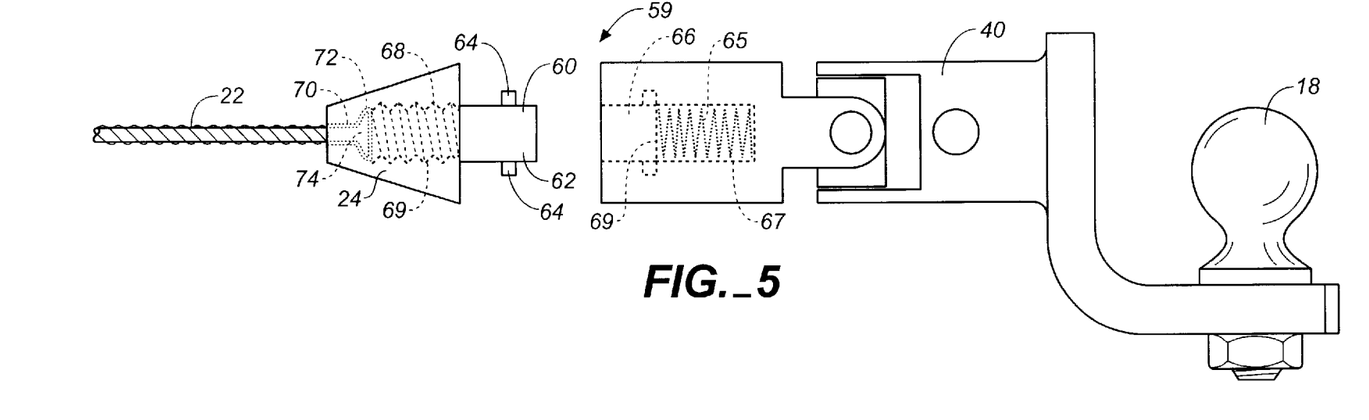
FIG. 5 is a side view in elevation showing the hitch bar detached from the cable lead, and particularly showing keyhole means for connecting the cable lead to the hitch bar.

FIG. 5 is a side view in elevation showing the hitch bar detached from the cable lead, and particularly showing a quick release system 59 for securely connecting the cable lead to the hitch bar. In this system, the cable lead terminates at its rear end in a quick attachment and release key 60 having a shaft portion 62 and two outwardly disposed wings or projections 64. The shaft and projections insert into a complementary keyhole 66 in the front portion 38 of hitch bar 14. When the quick attachment and release key is inserted into the keyhole, it may be turned a quarter turn to lock the post in the hole. Preferably, a strong helical compression spring 65 is positioned in a cavity 67, which is coterminus and coaxial with keyhole 66. The spring preferably has squared and ground ends and includes a plate 69 at the end proximate keyhole 66. The spring and plate assembly is compressed by fill insertion of release key 60 and is thus biased against release key 60 when the key is fully inserted into the key hole and turned, thereby preventing the release key from turning and pulling out of the hole under loads. The quick release system facilitates connection of the cable lead to the hitch bar with a one-handed operation requiring little more than an insertion and a turn: no heavy lifting is required, nor is any time consuming assembly of the hitch apparatus.

FIG. 5 also shows how the cable lead 24 may be connected to the cable itself. In this illustration, quick attachment and release key 60 is shown threadably inserted into cable lead 24 with a threaded portion 68 of said key engaged with a threaded aperture 69 in said cable lead. The threaded portion screws down to a tapered internal chamber 70 at the front end 72 of key 60. An enlarged terminal end 74 of cable 22 snugly fits into the tapered internal chamber 70 to hold the cable firmly within the cable lead.

Figure 6:
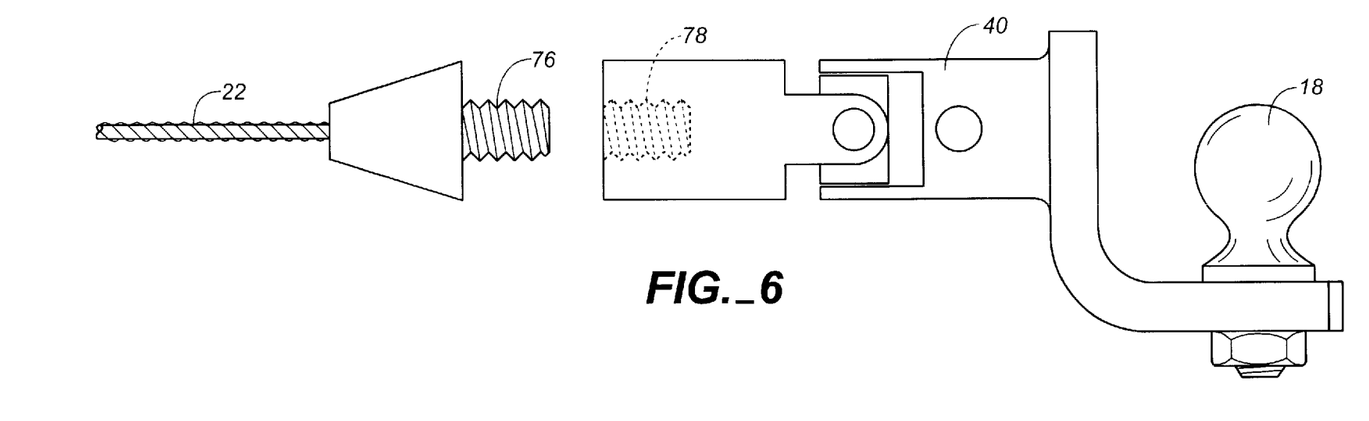
FIG. 6 shows an alternative means for connecting the cable lead to the hitch bar, namely a threaded post.

FIG. 6 shows another means for connecting the cable lead to the hitch bar, namely a threaded post. While this screw-type connection does not provide the convenience of the keyhole connection, it is a well known and reliable alternative that merits consideration. Much as the keyhole post is inserted into a complementary keyhole in the front portion of the hitch bar, threaded post 76 screws into threaded hole 78 for a similarly secure connection. The cable may be terminated within the cable lead in the fashion described above, which allows the cable lead to spin freely while the post 76 is screwed into the hole 78.

Figure 7:
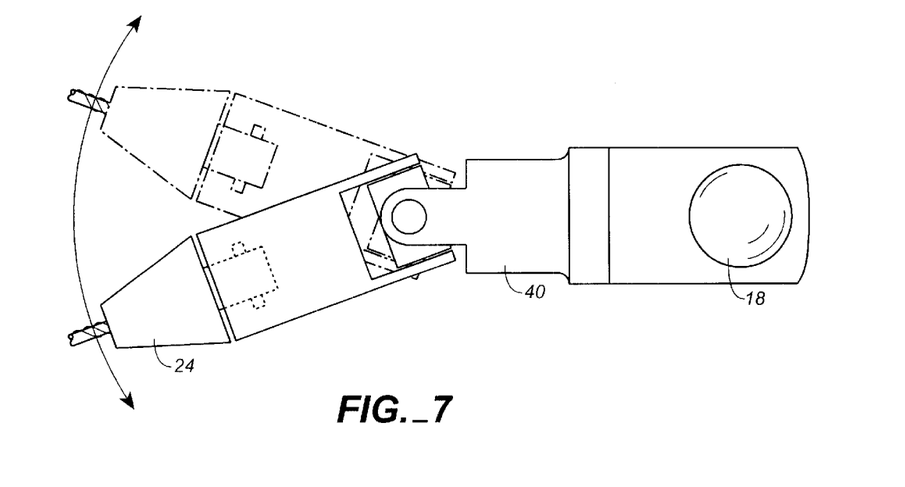
FIG. 7 is a top view of the hitch bar, tongue, and ball, showing the side-to-side swiveling of the hitch bar on its universal joint.
Figure 8:
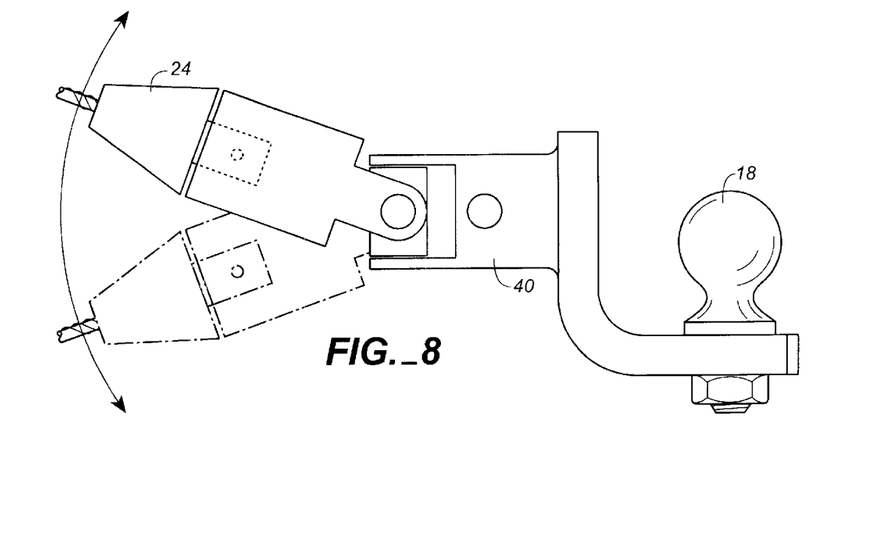
FIG. 8 is a side view in elevation of the up-down swiveling of the hitch bar on its universal joint.

FIG. 7 is a top view of the hitch bar, tongue, and ball, showing the side-to-side swiveling of the hitch bar on its universal joint, and FIG. 8 is a side view in elevation thereof, showing the updown swiveling of the hitch bar on its universal joint. These views collectively illustrate a distinct advantage of the automatic hitch coupling apparatus of the present invention; namely, its adaptability to awkward hitching configurations. In many situations, the towed vehicle and its trailer is sharply angled relative to the hitch bar receiver. Prior art devices include a significant disadvantage in that the cable connection to the hitch bar is strained by a bend in the cable. However, in the instant invention, the universal joint allows for free swiveling of the front portion 38 of up to ninety degrees (90°) relative to the rear portion 40. Thus, when the trailer is angled severely, the cable does not suffer from any bends at or near the cable lead. This also reduces the strain on the winch motor, as the pulling is made more effectual by the alignment of the front portion with the cable.

Figure 9:
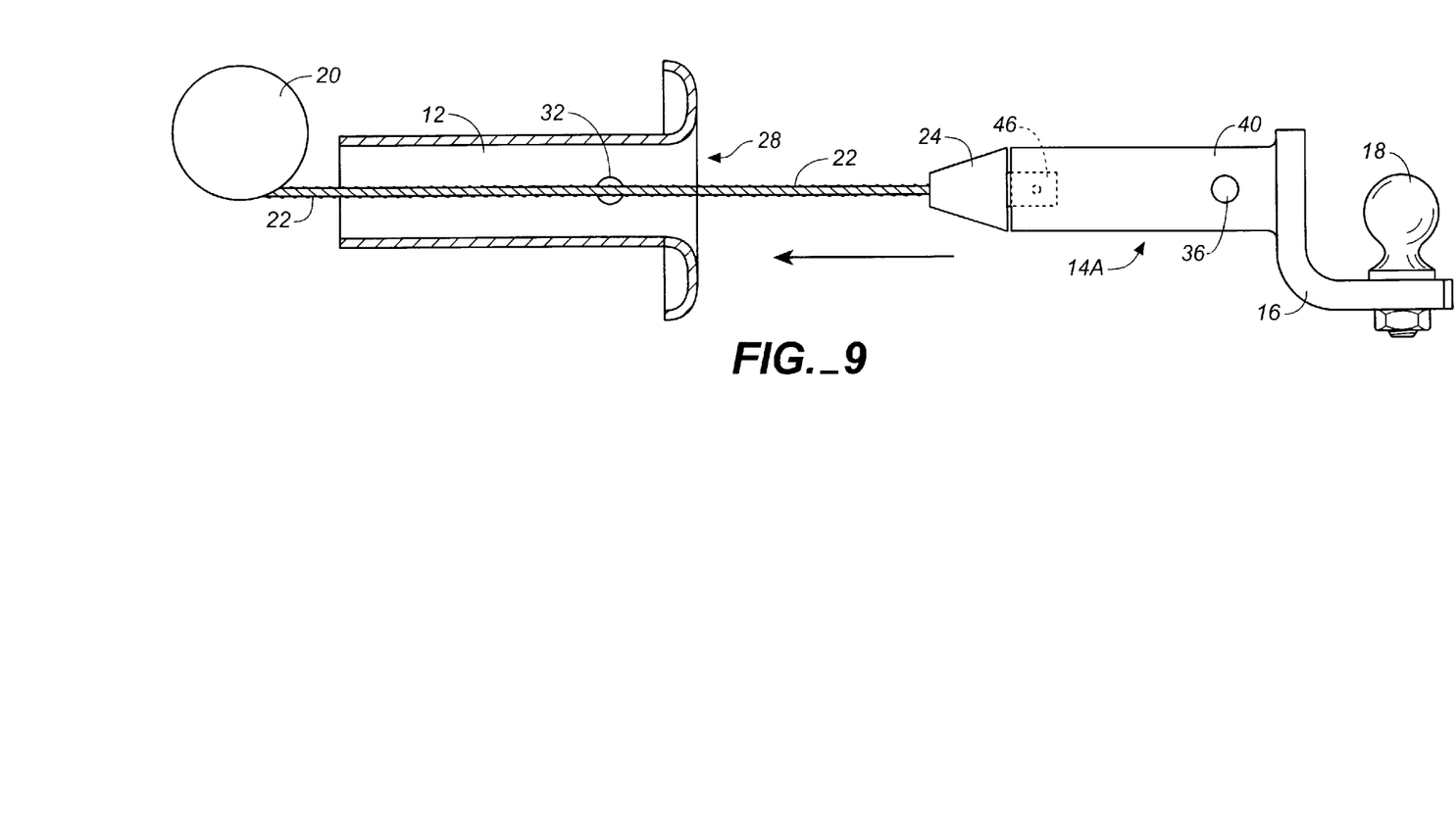
FIG. 9 is a partial cross-sectional side view in elevation of a second preferred embodiment of the inventive hitch assembly having a non-articulating hitch bar.

FIG. 9 is a partial cross-sectional side view in elevation of a second preferred embodiment of the inventive hitch assembly, shown having a non-articulating hitch bar 14a. Other than the absence of the universal joint coupling a front and rear portion of the hitch bar, the assembly is identical to the first preferred embodiment described in the foregoing paragraphs.

In use, the hitch bar receiver 12 is mounted on a rear platform (e.g., a bumper) of a towing vehicle, in a fashion well known in the art. The winch 20 may be mounted in a number of places relative to the receiver, either in a "piggy back" manner directly above the receiver, to the left or right of the receiver, or directly in front of the receiver. In all cases, the cable 22 feeds through the receiver rearwardly and out the flanged end 26. If the winch is "offset" from the receiver, either by positioning it above or to the side of the receiver, pulleys or rollers (not shown) may be implemented to center and feed the cable directly through the receiver hollow 28.

When the user wishes to tow a trailer, he or she simply backs the towing vehicle with its rear end in proximity to the trailer. He then exits and proceeds to the rear of the vehicle, engages the free spooling lever on the winch and pulls the cable via the cable lead to the trailer. Because the hitch ball 18 is preferably left connected to the trailer hitch socket 56, the procedure for connecting the cable lead to the hitch bar entails merely inserting the quick release and attachment key 60 into the keyhole and twisting the key one quarter turn clockwise or counterclockwise. The free spooling function of the winch is then disengaged, the power-in function engaged, and the cable retracted to pull the trailer into registration with the hitch receiver. When the hitch bar is fully received or nested within the receiver, the locking pin 34 is inserted into and through aperture 32 and through lock hole 36 to fix the hitch bar within the receiver. A cotter pin or other similar device may be employed to secure the locking pin, and a nut and bolt combination may be substituted for the locking pin.

As will be readily appreciated, the present invention solves numerous problems: First, it obviates the need to bring a towing and towed vehicle into alignment before the two can be hitched together; in fact, the two can be significantly out of alignment and still be successfully hitched using the inventive apparatus. Second, it obviates the need to back the towing vehicle very closely to the towed vehicle, the need to repeatedly exit and board the towing vehicle to check on the relative positions of the vehicles, or the need to employ a second person to assist in guiding the driver. Third, it eliminates the necessity of lifting a heavy trailer tongue up into the hitch bar receiver. Fourth, it eliminates the need of someone having strength for successful coupling. Finally, it enables hitching when the surface conditions are too slippery to appreciably pull the trailer to the towing vehicle.

In addition, the hitch assembly of the present invention allows for considerable versatility in use. For instance, hitch ball 18 may be mounted on either side of horizontal portion 50 of tongue 16. A low trailer tongue may thus be engaged by mounting the hitch ball on the inside surface 51 of the tongue's bend (resulting in a relatively low hitch ball position), and a high trailer tongue may be engaged by mounting the hitch ball on the outside surface of the tongue's bend (resulting in a relatively high hitch ball position). If necessary or desirable, the entire hitch bar and tongue portion of the assembly can be replaced with an assembly having dimensions suited for the trailer to be hauled.

The automatic trailer hitch coupling apparatus of the present invention may also be used in effecting an entirely dry boat launch or haul out. Whereas it is common for a towing vehicle to back into or nearly into a body of water at a boat ramp to conduct a launch or haul out, the present invention permits the user to park the towing vehicle well away from the water and then let the entire trailer gently roll down the boat ramp and into the water for launching or hauling out a boat. This eliminates the risks and damage caused by backing into or near the water.

In another aspect, the inventive apparatus may be characterized as a trailer hitch coupling apparatus comprising power means operably connected to a retractable and extendable cable, in which the cable includes a terminal end coupled to a cable lead, and further comprising a hitch bar having a front portion pivotally connected to a rear portion, wherein the rear portion is integrally connected to a hitch tongue having a horizontal portion; connection means for connecting the cable lead to the front portion of the hitch bar; a hitch ball mounted on the horizontal portion of the hitch tongue; a tubular hitch bar receiver for slidable insertion and registration of said hitch bar; and locking means for locking the hitch bar in the hitch bar receiver when the hitch bar is fully inserted into the receiver.

While this invention has been described in connection with preferred embodiments thereof, it is obvious that modifications and changes therein may be made by those skilled in the art to which it pertains without departing from the spirit and scope of the invention. For instance, although the present invention is described for use with conventional vehicle towing hitches, the principle of operation is equally applicable to hitches for other towing vehicles and towed objects. Accordingly, the scope of this invention is to be limited only by the appended claims.

What is claimed as invention is:

1. An automatic trailer hitch coupling apparatus for coupling a towed vehicle to a towing vehicle, said apparatus having a hitch and an unhitched configuration, said apparatus comprising:
    a tubular hitch bar receiver for mounting proximate the rear end of the towing vehicle;
    a hitch bar having an integral tongue to which a hitch ball is mounted, said hitch bar adapted for slidable insertion into said hitch bar receiver;
    a winch having an extendable and retractable cable threaded through said hitch bar receiver, said cable having a terminal end;
    a cable lead connected to said terminal end of said cable; and
    a quick release system for detachably connecting said cable lead to said hitch bar, wherein said quick release lock system comprises a quick attachment and release key integral with the terminal end of said cable lead, said key having a shaft portion and at least one outwardly disposed projection, and wherein said hitch bar includes a key hole complementary to said key, wherein said key may be inserted into the key hole and locked within said hitch bar by inserting the key fully into the hole and turning the key.

2. The apparatus of claim 1, wherein said hitch bar receiver includes a rear end and has a square cross section, and wherein said rear end is open and flanged on all four sides.

3. The apparatus of claim 1, wherein said hitch bar receiver has at least one aperture and wherein said hitch bar has at least one locking hole which is aligned with the aperture in said receiver when said hitch bar is fully inserted into said receiver in the hitched configuration, and wherein said apparatus further includes a locking pin for removable insertion through the aperture in said receiver and the locking hole in said hitch bar when the aperture and hole are aligned.

4. The apparatus of claim 1, wherein said hitch bar includes a front portion and a rear portion, and wherein said front portion includes means for detachable connection to said cable lead and wherein said front portion is connected to said rear portion by a universal joint that permits said front and said rear portions to swivel in two planes perpendicular relative to one another.

5. An automatic trailer hitch coupling assembly, comprising:
    a hitch bar having a front portion pivotally connected to a rear portion, said rear portion integrally connected to a hitch tongue having a horizontal portion, said front portion including means for detachable connection to said cable lead;
    a quick release lock system for connecting said cable lead to said front portion of said hitch bar, said quick release lock system comprising a quick attachment and release key integral with the terminal end of said cable lead, said key having a shaft portion and at least one outwardly disposed projection, and wherein said hitch bar includes a key hole complementary to said key, wherein said key may be inserted into the key hole and locked within said hitch bar by inserting said key fully into the hole and turning said key;
    a hitch ball mounted on said horizontal portion of said hitch tongue;
    a tubular hitch bar receiver for slidable insertion and registration of said hitch bar;
    power means operably connected to a retractable and extendable cable, said cable threaded through said tubular hitch bar receiver and having a terminal end coupled to a cable lead; and
    locking means for locking said hitch bar in said hitch bar receiver when said hitch bar is fully inserted into said hitch bar receiver.

6. The automatic trailer hitch coupling assembly of claim 5, wherein said front portion of said hitch bar is connected to said rear portion of said hitch bar with a universal joint that allows for between thirty and ninety degrees of motion of said front portion to said rear portion in two perpendicular planes.

7. The apparatus of claim 5, wherein said hitch bar includes a cavity coterminus and coaxial with the key hole and a compression spring disposed in said the cavity, said compression spring biased against said key when said key is fully inserted into the key hole.

8. The apparatus of claim 5, wherein said key includes a threaded shaft for threadable insertion into a threaded aperture in said cable lead, wherein said cable lead includes a tapered internal chamber, and wherein said cable has an enlarged terminal end which fits snugly into the tapered internal chamber to secure the cable firmly within said cable lead.

9. The apparatus of claim 5, wherein said connection means comprises a threaded post integral with the terminal end of said cable lead, and wherein said front portion of said hitch bar includes a threaded aperture for threadable insertion of said threaded post.

* * * * *